(12) United States Patent (10) Patent No.: US 9,021,053 B2
Bernbo et al. (45) Date of Patent: Apr. 28, 2015

(54) METHOD AND DEVICE FOR WRITING DATA TO A DATA STORAGE SYSTEM COMPRISING A PLURALITY OF DATA STORAGE NODES

(75) Inventors: Stefan Bernbo, Karlskrona (SE);
Christian Melander, Rodeby (SE);
Roger Persson, Karlskrona (SE);
Gustav Petersson, Sturko (SE)

(73) Assignee: Compuverde AB (SE)

( * ) Notice: Subject to any disclaimer, the term of this patent is extended or adjusted under 35 U.S.C. 154(b) by 78 days.

(21) Appl. No.: 13/224,404

(22) Filed: Sep. 2, 2011

(65) Prior Publication Data

US 2013/0060884 A1 Mar. 7, 2013

(51) Int. Cl.
*G06F 15/16* (2006.01)
*G06F 17/30* (2006.01)

(52) U.S. Cl.
CPC ................................ *G06F 17/30212* (2013.01)

(58) Field of Classification Search
CPC ..... G06F 11/008; G06F 3/0614; G06F 3/631; G06F 3/0683; G06F 3/1236
USPC ................. 709/203, 217, 216, 223, 224, 226; 710/18, 33; 711/114, 154, 161
See application file for complete search history.

(56) References Cited

U.S. PATENT DOCUMENTS

| 3,707,707 | A | 12/1972 | Spencer et al. |
| 5,787,247 | A | 7/1998 | Norin et al. |
| 6,003,065 | A | 12/1999 | Yan et al. |
| 6,021,118 | A | 2/2000 | Houck et al. |
| 6,055,543 | A | 4/2000 | Christensen et al. |
| 6,389,432 | B1 * | 5/2002 | Pothapragada et al. ............... 1/1 |
| 6,470,420 | B1 * | 10/2002 | Hospodor ..................... 711/114 |
| 6,782,389 | B1 | 8/2004 | Chrin et al. |
| 6,925,737 | B2 | 8/2005 | Bolduan et al. |
| 6,985,956 | B2 | 1/2006 | Luke et al. |
| 7,200,664 | B2 | 4/2007 | Hayden |

(Continued)

FOREIGN PATENT DOCUMENTS

| CN | 1726454 A | 1/2006 |
| EP | 774723 A3 | 7/1998 |

(Continued)

OTHER PUBLICATIONS

Anonymous: "Squid configuration directive reply_body_max_size", Dec. 21, 2008, pp. 1-2. XP55042055, Retrieved from the Internet: URL:http://web.archive.org/web/20081221142145/http://www.squid-cache.org/Doc/config/reply_body_max_size/ [retrieved on Oct. 24, 2012], p. 1.

(Continued)

*Primary Examiner* — Barbara Burgess
(74) *Attorney, Agent, or Firm* — Condo Roccia Koptiw LLP (57) ABSTRACT

There is disclosed a method for writing data in a data storage system comprising a plurality of data storage nodes, the method being employed in a server running an application which accesses data in the data storage system, and comprising: sending a multicast storage query to a plurality of said storage nodes; receiving a plurality of responses from a subset of said storage nodes, said responses including a storage node property; selecting at least two storage nodes in the subset for storing said data, based on said responses, wherein the selecting is based on a data property of the data to be stored and a storage node property.

16 Claims, 7 Drawing Sheets

(56) References Cited

U.S. PATENT DOCUMENTS

| | | | |
|---|---|---|---|
| 7,206,836 B2 | 4/2007 | Dinker et al. | |
| 7,266,556 B1 | 9/2007 | Coates | |
| 7,320,088 B1 | 1/2008 | Gawali | |
| 7,340,510 B1 | 3/2008 | Liskov et al. | |
| 7,352,765 B2 | 4/2008 | Dai et al. | |
| 7,406,484 B1 | 7/2008 | Srinivasan et al. | |
| 7,487,305 B2 | 2/2009 | Hill et al. | |
| 7,503,052 B2 | 3/2009 | Castro et al. | |
| 7,546,486 B2 | 6/2009 | Slik et al. | |
| 7,568,069 B2 | 7/2009 | Jantz et al. | |
| 7,590,672 B2 | 9/2009 | Slik et al. | |
| 7,593,966 B2 | 9/2009 | Therrien et al. | |
| 7,624,155 B1 | 11/2009 | Nordin et al. | |
| 7,624,158 B2 | 11/2009 | Slik et al. | |
| 7,631,023 B1 * | 12/2009 | Kaiser et al. | 1/1 |
| 7,631,045 B2 | 12/2009 | Boerries et al. | |
| 7,631,313 B2 | 12/2009 | Mayhew et al. | |
| 7,634,453 B1 | 12/2009 | Bakke et al. | |
| 7,647,329 B1 | 1/2010 | Fischman et al. | |
| 7,769,711 B2 | 8/2010 | Srinivasan et al. | |
| 7,778,972 B1 * | 8/2010 | Cormie et al. | 707/626 |
| 7,822,766 B2 | 10/2010 | Arndt et al. | |
| 7,840,992 B1 | 11/2010 | Dufrene et al. | |
| 7,873,650 B1 | 1/2011 | Chapman et al. | |
| 7,885,982 B2 | 2/2011 | Wight et al. | |
| 8,060,598 B1 | 11/2011 | Cook et al. | |
| 8,073,881 B1 | 12/2011 | Georgiev | |
| 8,190,561 B1 | 5/2012 | Poole et al. | |
| 8,255,430 B2 | 8/2012 | Dutton et al. | |
| 8,296,398 B2 | 10/2012 | Lacapra et al. | |
| 8,417,828 B2 | 4/2013 | Ma et al. | |
| 8,561,115 B2 | 10/2013 | Hattori et al. | |
| 8,577,957 B2 | 11/2013 | Behar et al. | |
| 2001/0034812 A1 | 10/2001 | Ignatius et al. | |
| 2001/0047400 A1 | 11/2001 | Coates et al. | |
| 2002/0042693 A1 | 4/2002 | Kampe et al. | |
| 2002/0103888 A1 | 8/2002 | Janz et al. | |
| 2002/0114341 A1 | 8/2002 | Sutherland et al. | |
| 2002/0145786 A1 | 10/2002 | Chang et al. | |
| 2003/0026254 A1 | 2/2003 | Sim | |
| 2003/0120654 A1 | 6/2003 | Edlund et al. | |
| 2003/0126122 A1 | 7/2003 | Bosley et al. | |
| 2003/0154238 A1 | 8/2003 | Murphy et al. | |
| 2003/0172089 A1 | 9/2003 | Douceur et al. | |
| 2003/0177261 A1 | 9/2003 | Sekiguchi et al. | |
| 2004/0059805 A1 | 3/2004 | Dinker et al. | |
| 2004/0064729 A1 | 4/2004 | Yellepeddy | |
| 2004/0078466 A1 | 4/2004 | Coates et al. | |
| 2004/0088297 A1 | 5/2004 | Coates et al. | |
| 2004/0111730 A1 | 6/2004 | Apte | |
| 2004/0243675 A1 | 12/2004 | Taoyama et al. | |
| 2004/0260775 A1 | 12/2004 | Fedele | |
| 2005/0010618 A1 | 1/2005 | Hayden | |
| 2005/0015431 A1 | 1/2005 | Cherkasova | |
| 2005/0015461 A1 | 1/2005 | Richard et al. | |
| 2005/0038990 A1 | 2/2005 | Sasakura et al. | |
| 2005/0044092 A1 | 2/2005 | Adya et al. | |
| 2005/0177550 A1 | 8/2005 | Jacobs et al. | |
| 2005/0193245 A1 | 9/2005 | Hayden et al. | |
| 2005/0204042 A1 | 9/2005 | Banerjee et al. | |
| 2005/0246393 A1 | 11/2005 | Coates et al. | |
| 2005/0256894 A1 | 11/2005 | Talanis et al. | |
| 2005/0278552 A1 | 12/2005 | Delisle et al. | |
| 2005/0283649 A1 | 12/2005 | Turner et al. | |
| 2006/0031230 A1 | 2/2006 | Kumar | |
| 2006/0031439 A1 | 2/2006 | Saffre | |
| 2006/0080574 A1 | 4/2006 | Saito et al. | |
| 2006/0090045 A1 | 4/2006 | Bartlett et al. | |
| 2006/0090095 A1 | 4/2006 | Massa et al. | |
| 2006/0112154 A1 | 5/2006 | Douceur et al. | |
| 2007/0022087 A1 | 1/2007 | Bahar et al. | |
| 2007/0022121 A1 | 1/2007 | Bahar et al. | |
| 2007/0022122 A1 | 1/2007 | Bahar et al. | |
| 2007/0022129 A1 | 1/2007 | Bahar et al. | |
| 2007/0055703 A1 | 3/2007 | Zimran et al. | |
| 2007/0088703 A1 | 4/2007 | Kasiolas et al. | |
| 2007/0094269 A1 | 4/2007 | Mikesell et al. | |
| 2007/0094354 A1 | 4/2007 | Soltis | |
| 2007/0198467 A1 | 8/2007 | Wiser et al. | |
| 2007/0276838 A1 | 11/2007 | Abushanab et al. | |
| 2007/0288494 A1 | 12/2007 | Chrin et al. | |
| 2007/0288533 A1 | 12/2007 | Srivastava et al. | |
| 2007/0288638 A1 | 12/2007 | Vuong et al. | |
| 2008/0043634 A1 | 2/2008 | Wang et al. | |
| 2008/0077635 A1 | 3/2008 | Sporny et al. | |
| 2008/0104218 A1 | 5/2008 | Liang et al. | |
| 2008/0109830 A1 | 5/2008 | Giotzbach et al. | |
| 2008/0168157 A1 | 7/2008 | Marchand | |
| 2008/0171556 A1 | 7/2008 | Carter | |
| 2008/0172478 A1 | 7/2008 | Kiyohara et al. | |
| 2008/0198752 A1 | 8/2008 | Fan et al. | |
| 2008/0235321 A1 | 9/2008 | Matsuo | |
| 2008/0270822 A1 | 10/2008 | Fan et al. | |
| 2009/0043922 A1 * | 2/2009 | Crowther | 710/33 |
| 2009/0083810 A1 | 3/2009 | Hattori et al. | |
| 2009/0132543 A1 | 5/2009 | Chatley et al. | |
| 2009/0172211 A1 * | 7/2009 | Perry et al. | 710/18 |
| 2009/0172307 A1 * | 7/2009 | Perry et al. | 711/154 |
| 2009/0228669 A1 * | 9/2009 | Slesarev et al. | 711/161 |
| 2009/0271412 A1 | 10/2009 | Lacapra et al. | |
| 2009/0287842 A1 | 11/2009 | Plamondon | |
| 2010/0115078 A1 | 5/2010 | Ishikawa et al. | |
| 2010/0161138 A1 | 6/2010 | Lange et al. | |
| 2010/0169391 A1 | 7/2010 | Baptist et al. | |
| 2010/0169415 A1 | 7/2010 | Leggette et al. | |
| 2010/0185693 A1 | 7/2010 | Murty et al. | |
| 2010/0198888 A1 | 8/2010 | Blomstedt et al. | |
| 2010/0198889 A1 | 8/2010 | Byers et al. | |
| 2010/0223262 A1 | 9/2010 | Krylov et al. | |
| 2010/0303071 A1 | 12/2010 | Kotalwar et al. | |
| 2011/0055353 A1 | 3/2011 | Tucker et al. | |
| 2011/0072206 A1 | 3/2011 | Ross et al. | |
| 2011/0125814 A1 | 5/2011 | Slik et al. | |
| 2011/0252204 A1 | 10/2011 | Coon et al. | |
| 2012/0331021 A1 | 12/2012 | Lord | |
| 2013/0060884 A1 | 3/2013 | Bernbo et al. | |
| 2013/0103851 A1 | 4/2013 | Umeki et al. | |

FOREIGN PATENT DOCUMENTS

| | | |
|---|---|---|
| EP | 934568 B1 | 6/2003 |
| EP | 1521189 A2 | 4/2005 |
| EP | 1578088 A2 | 9/2005 |
| EP | 1669850 A1 | 6/2006 |
| EP | 1798934 A1 | 6/2007 |
| EP | 2031513 A2 | 3/2009 |
| JP | 06348527 A | 12/1994 |
| JP | 11249874 A | 9/1999 |
| JP | 2003030012 A | 1/2003 |
| JP | 2003223286 A | 8/2003 |
| JP | 2003248607 A | 9/2003 |
| JP | 2003271316 A | 9/2003 |
| JP | 2007058275 A | 3/2007 |
| JP | 2008250767 A | 10/2008 |
| JP | 2000322292 A | 11/2009 |
| JP | 2009259007 A | 11/2009 |
| WO | WO 99/38093 A1 | 7/1999 |
| WO | WO-0118633 A1 | 3/2001 |
| WO | WO-0235359 A2 | 5/2002 |
| WO | WO 02/044835 A2 | 6/2002 |
| WO | WO-2004053677 A2 | 6/2004 |
| WO | WO 2006/124911 A2 | 11/2006 |
| WO | WO 2007/014296 A2 | 2/2007 |
| WO | WO 2007/115317 A2 | 10/2007 |
| WO | WO-2007134918 A1 | 11/2007 |
| WO | WO-2008069811 A1 | 6/2008 |
| WO | WO-2008102195 A1 | 8/2008 |
| WO | WO 2009/048726 A1 | 4/2009 |
| WO | WO 2010/046393 A2 | 4/2010 |

(56) References Cited

FOREIGN PATENT DOCUMENTS

| WO | WO 2010/080533 A2 | 7/2010 |
| WO | WO 2011/131717 A1 | 10/2011 |

OTHER PUBLICATIONS

Anonymous: "FAQ: How do I block large files by Content Size before download?", Mar. 23, 2009, pp. 1-2, XP55042048, Retrieved from the Internet: URL:http://www.trustwave.com/support/kb/article.aspx?id=13166, [retrieved on Oct. 24, 2012], p. 1.

Anonymous: "Queues for Prioritized Message Processing", Feb. 6, 2009, p. 1, XP55042195, Retrieved from the Internet: URL:http://web.archive.org/web/20090206110207/http://help.sap.com/saphelp_nw04/helpdata/en/04/827440c36ed562e10000000a155106/content.htm, [retrieved on Oct. 25, 2012], p. 1.

Chi Zhang et al: "Brushwood: Distributed Trees in Peer-to-Peer Systems", 2005, Peer-To-Peer Systems IV Lecture Notes in Computer Science;;LNCS, Springer, Berlin, DE, pp. 47-57, XP019019955, ISBN: 978-3-540-29068-1, sections 1-3.

Anonymous: "FastTrack", Jan. 8, 2011, pp. 1-3, XP55041807, Retrieved from the Internet: URL:http://de.wikipedia.org/w/index.php?title=FastTrack&oldid=83614953 [retrieved on Oct. 22, 2012], pp. 1-2.

Anonymous: "Load balancing (computing)", Aug. 25, 2011, pp. 1-6, XP55041742, Retrieved from the Internet: URL:http://en.wikipedia.org/w/index.php?title=Load_balancing_%28computing%29&oldid=446655159 [retrieved on Oct. 22, 2012], pp. 1-5.

U.S. Appl. No. 13/224,393, filed Sep. 2, 2011, Bernbo et al.
U.S. Appl. No. 13/224,415, filed Sep. 2, 2011, Bernbo et al.
U.S. Appl. No. 13/224,424, filed Sep. 2, 2011, Bernbo et al.
U.S. Appl. No. 13/224,433, filed Sep. 2, 2011, Bernbo et al.
U.S. Appl. No. 13/224,446, filed Sep. 2, 2011, Bernbo et al.
U.S. Appl. No. 13/125,524, filed Apr. 21, 2011, Bernbo et al.
U.S. Appl. No. 13/174,350, filed Jun. 30, 2011, Bernbo et al.

Nancy P. Kronenberg et al., "VAXclusters: A Closely-Coupled Distributed System, ACM Transactions on Computer Systems", vol. 4, No. 2, May 1986, pp. 130-146.

HP Volume Shadowing for OpenVMS, "Introduction to Volume Shadowing for OpenVMS", OpenVMS Alpha 7.3-2, Sep. 2003.

Keith Parris, "Using OpenVMS Clusters for Diaster Tolerance", HP Services—Systems Engineering.

Wataru Katsurashima et al., "NAS Switch: A novel CIFS server virtualization", IEEE, 2003.

U.S. Appl. No. 13/170,672, filed Jun. 28, 2011, Bernbo et al.
U.S. Appl. No. 13/170,735, filed Jun. 28, 2011, Bernbo et al.

International Patent Application No. PCT/EP2009/63796: Written Opinion, Jan. 18, 2010, 6 pages.

International Patent Application No. PCT/EP2009/63796: International Preliminary Report on Patentability, Jan. 12, 2011, 5 pages.

International Patent Application No. PCT/EP2011/056317: International Search Report, Aug. 9, 2011, 4 pages.

Tang et al., "An Efficient Data Location Protocol for Self-organizing Storage Clusters", Supercomputing, ACM/IEEE Conference, Phoenix, AZ, USA, Nov. 15-21, 2003, 1-13.

Weatherspoon et al., "Antiquity: Exploiting a Secure Log for Wide-Area Distributed Storage", Proceedings of the 2007 EuroSys Conference, ACM 2007, Lisbon, Portugal, Mar. 21-23, 2007, 371-384.

* cited by examiner

METHOD AND DEVICE FOR WRITING DATA TO A DATA STORAGE SYSTEM COMPRISING A PLURALITY OF DATA STORAGE NODES

CROSS-REFERENCE TO RELATED APPLICATIONS

This application includes subject matter that may be related to subject matter included in the following applications: U.S. patent application Ser. No. 13/224,393 entitled "A Method And Device For Maintaining Data In A Data Storage System Comprising A Plurality Of Data Storage Nodes," filed Sep. 2, 2011; U.S. patent application Ser. No. 13/224,415 entitled "Method For Data Maintenance," filed Sep. 2, 2011; U.S. patent application Ser. No. 13/224,424 entitled "Method For Handling Requests In A Storage System And A Storage Node For A Storage System," filed Sep. 2, 2011; U.S. patent application Ser. No. 13/224,433 entitled "Method For Data Retrieval From A Distributed Data Storage System," filed Sep. 2, 2011; and U.S. patent application Ser. No. 13/224,446 entitled "Method For Updating Data In A Distributed Data Storage System," filed Sep. 2, 2011.

TECHNICAL FIELD

The present disclosure relates a method and a device for writing data in a data storage system comprising a plurality of data storage nodes, the method being employed in a server in the data storage system.

BACKGROUND

Such a method is disclosed in, for example, US Patent Publication No. 2005/0246393 A1. This method is disclosed for a system that uses a plurality of storage centres at geographically disparate locations. Distributed object storage managers are included to maintain information regarding stored data.

One problem associated with such a system is how to accomplish simple and yet robust and reliable writing of data.

SUMMARY OF THE INVENTION

There is therefore disclosed a method for writing data in a data storage system including a plurality of data storage nodes. The method may be employed in a server running an application which accesses data in the data storage system. The method may include sending a multicast storage query to a plurality of said storage nodes. Responses may be received from a subset of said storage nodes, and the responses may include a storage node property. The server may select at least two storage nodes in the subset for storing said data, and the selection may be based on said responses. The selection may be based on a data property of the data to be stored and/or the received storage node property.

A method for writing data to a data storage system may be accomplished via a server running an application which accesses data in the data storage system. The method may include sending a multicast storage query to a plurality of storage nodes, and receiving a plurality of responses from a subset of said storage nodes. The responses may include storage node information relating to each of the responding storage nodes. The server may select at least two storage nodes in the subset, for example based on said responses. The selection may include determining, based on an algorithm, for each storage node in the subset, a probability factor which may be based on its storage node information. The server may randomly select said at least two storage nodes. The probability of a storage node being selected may depend on its probability factor. The method may further involve sending data and a data identifier, corresponding to the data, to the selected storage nodes.

In an example embodiment, data may be stored in a content sensitive way. For example, a storage node may be selected that has basic characteristics or properties that match or are compatible with the attributes implied by the data.

Example node properties may include the type of disk, response time, redundancy configuration, reliability, node environment, territory, and/or energy consumption.

The data property may imply or be associated with a number of allowed storage node properties. For example, a certain reported data property may be used by the server and/or a storage node to select another storage node based on a corresponding storage node property. As an example, if the data property is that the data may need to be accessed quickly, the corresponding storage node property may be response time.

The data property may be defined by the type of user that is linked to the data. A premium user may require a more reliable storage node.

The data property may also defined by the type of data. For instance data that need be accessed quickly may imply the need of a quick storage node.

The disclosure further relates to a method for writing data in a data storage system including a plurality of data storage nodes. The method may be employed in a server running an application which accesses data in the data storage system. The method may include selecting a set of allowed storage node properties based on a data property of the data to be stored. The allowed storage node properties may be properties that may be possessed by a storage node and properties which the server desires be present in the storage node which will store the particular data. The server may send a multicast storage query to a plurality of said storage nodes, and the storage query may include the allowed storage node properties. The server may receive a plurality of responses from a subset of said storage nodes which comply with requirements implied by the allowed storage node properties. The server may select at least two storage nodes in the subset for storing said data, for example based on said responses.

The disclosure further relates to a device for writing data in a data storage system. The data storage system may include a plurality of data storage nodes. The device for writing data may be included in a server running an application which accesses data in the data storage system. The device may send a multicast storage query to a plurality of said storage nodes. The device may receive a plurality of responses from a subset of said storage nodes. The responses may include a storage node property. The device may select at least two storage nodes in the subset for storing said data, for example based on said responses. The selection may be based on a data property of the data to be stored and/or a storage node property.

DETAILED DESCRIPTION

The present disclosure is related to a distributed data storage system including a plurality of storage nodes. The structure of the system and the context in which it is used is outlined in FIG. 1.

Figure 1:
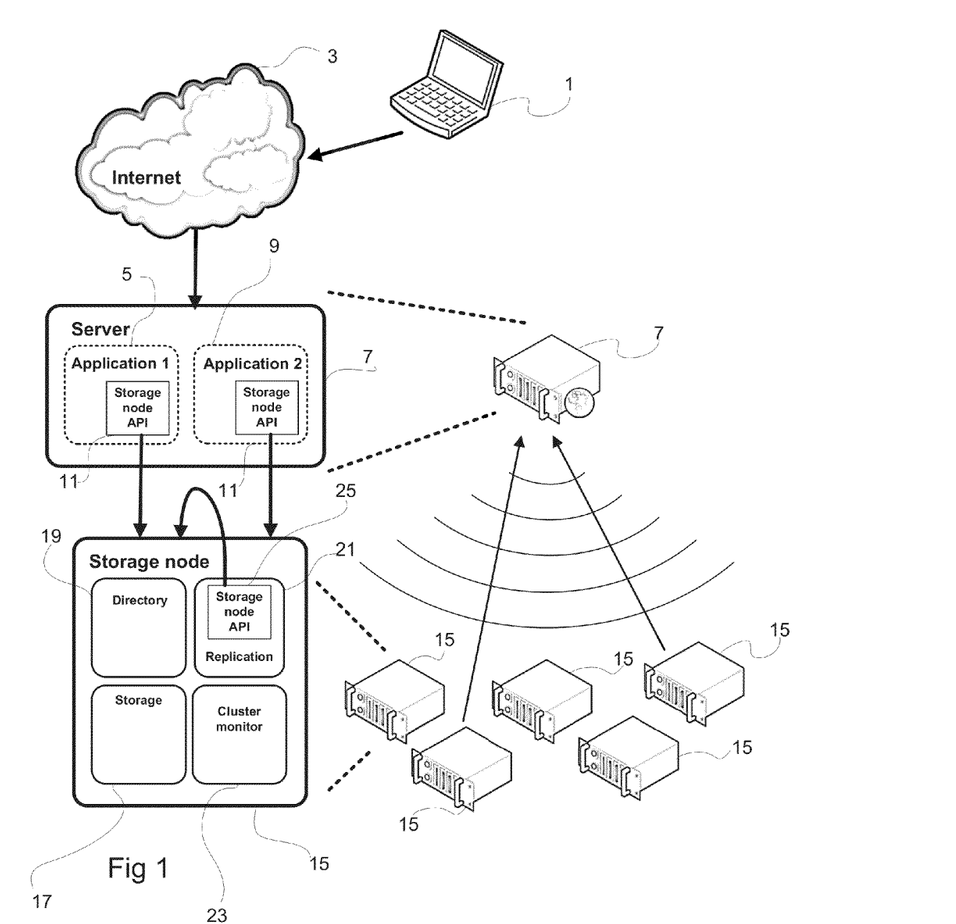
FIG. 1 illustrates a distributed data storage system.

A user computer 1 may access, for example via the Internet 3, an application 5 running on a server 7. The user context, as illustrated here, may be a regular client-server configuration. However, it should be noted that the data storage system to be disclosed may be useful also in other configurations.

In the illustrated case, two applications 5, 9 run on the server 7. Of course however, this number of applications may be different. Each application may have an API (Application Programming Interface) 11 which provides an interface in relation to the distributed data storage system 13 and may support requests, typically write and read requests, from the applications running on the server. From an application's point of view, reading or writing information from/to the data storage system 13 may be transparent and may be similar to using any other type of storage solution, for instance a file server or a hard drive.

Each API 11 may communicate with storage nodes 15 in the data storage system 13, and the storage nodes may communicate with each other. These communications may be based on TCP (Transmission Control Protocol) and UDP (User Datagram Protocol).

It should be noted that different APIs 11 on the same server 7 may access different sets of storage nodes 15. It should further be noted that there may exist more than one server 7 which accesses each storage node 15. This, however does not to any greater extent affect the way in which the storage nodes operate, as will be described later.

The components of the distributed data storage system may be the storage nodes 15 and the APIs 11, in the server 7 which access the storage nodes 15. The present disclosure therefore relates to methods carried out in the server 7 and in the storage nodes 15. Those methods will primarily be embodied as software/hardware combination implementations which may be implemented on the server and the storage nodes, respectively, and may together determining for the operation and the properties of the overall distributed data storage system.

The storage node 15 may typically be embodied by a file server which is provided with a number of functional blocks. The storage node may thus include a tangible storage medium 17, which typically comprises of a number of hard drives, optionally configured as a RAID (Redundant Array of Independent Disk) system. Other types of storage media are however conceivable as well. For instance, solid state drives, SSDs, or even random access memory, RAM, units may be used.

The storage node 15 may further include a directory 19, which may include lists of data entity/storage node relations as a host list, as will be discussed later.

In addition to the host list, each storage node may contain a node list including the IP addresses of all or some storage nodes in its set or group of storage nodes. The number of storage nodes in a group may vary from a few to hundreds of storage nodes. The node list may further have a version number.

Additionally, the storage node 15 may include a replication block 21 and a cluster monitor block 23. The replication block 21 may include a storage node API 25, and may be configured to execute functions for identifying the need for and carrying out a replication process, as will be described in detail later. The storage node API 25 of the replication block 21 may contain code that to a great extent corresponds to the code of the server's 7 storage node API 11, as the replication process may include actions that correspond to a great extent to the actions carried out by the server 7 during reading and writing operations to be described. For instance, the writing operation carried out during replication corresponds to a great extent to the writing operation carried out by the server 7. The cluster monitor block 23 may be configured to carry out monitoring of other storage nodes in the data storage system 13, as will be described in more detail later.

The storage nodes 15 of the distributed data storage system may be considered to exist in the same hierarchical level. For example, there may be no appointed master storage node that is responsible for maintaining a directory of stored data entities and monitoring data consistency, etc. Instead, all storage nodes 15 may be considered equal from an hierarchical point of view, even though they may have different qualities as will be discussed in greater detail later. All storage nodes may, at times, carry out data management operations vis-à-vis other storage nodes in the system. This equality may help ensure that the system is robust. In case of a storage node malfunction other nodes in the system may provide services on behalf of the malfunctioning node (e.g., make copies of files, provide access to files, answer requests, etc.) and ensure reliable data storage.

The operation of the system may be described in relation to the reading of data in the storage system, writing of data in the storage system, and/or data maintenance. Even though these methods work very well together, it should be noted that they may in principle also be carried out independently of each other. That is, for instance the data reading method may provide excellent properties even if the data writing method of the present disclosure is not used, and vice versa.

The reading method may be described with reference to FIGS. 2A-2C and 3, the latter being a flowchart illustrating an example method.

The reading, as well as other functions in the system, may utilise multicast communication to communicate simultaneously with a plurality of storage nodes. By a multicast or IP multicast, it is meant a point-to-multipoint communication which may be accomplished by sending a message to an IP address which is reserved for multicast applications.

For example, a message, typically a request, may be sent to such an IP address (e.g. 244.0.0.1), and a number of recipient servers may be registered as subscribers to that IP address. Each of the recipient servers may have its own IP address. When a switch in the network receives the message directed to 244.0.0.1, the switch may forward the message to the IP addresses of each server registered as a subscriber.

In principle, a single server may be registered as a subscriber to a multicast address, in which case a point-to-point, communication is achieved. However, in the context of this disclosure, such a communication may nevertheless be considered a multicast communication since a multicast scheme is employed.

Unicast communication may also be employed. Unicast communication may refer to a communication with a single recipient.

Figure 2A:
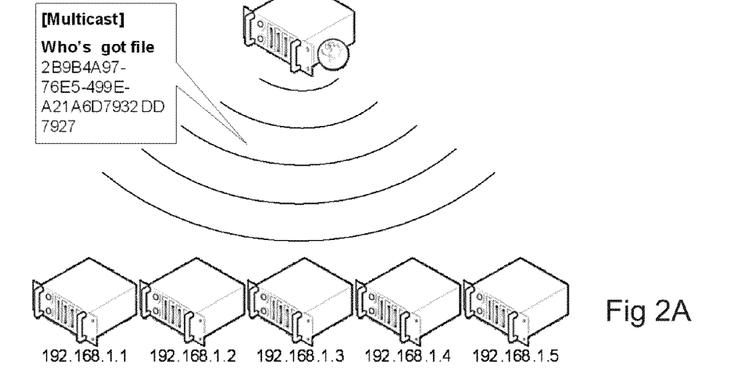
FIGS. 2A-2C, and FIG. 3 illustrate a data reading process.
Figure 2B:
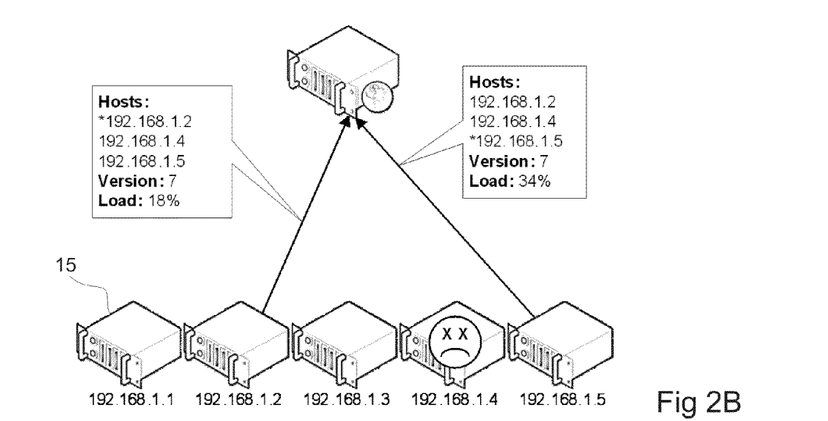
Figure 3:
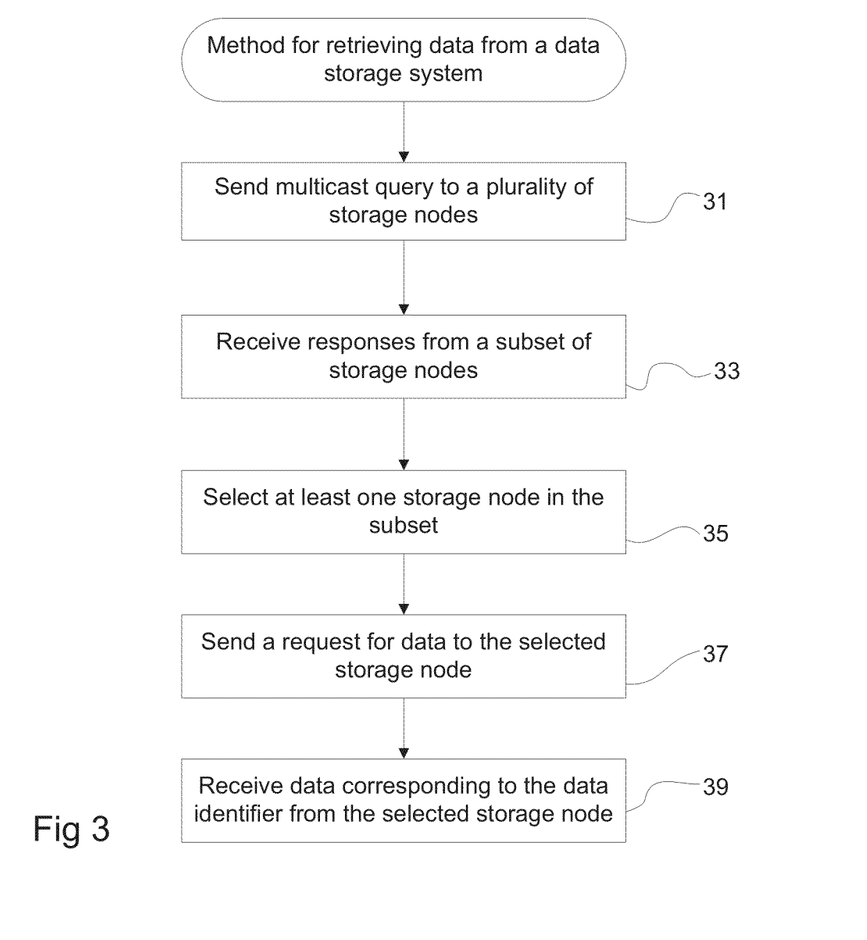

With reference to FIG. 2A and FIG. 3, the method for retrieving data from a data storage system may include the sending 31 of a multicast query to a plurality of storage nodes 15. For purposes of illustration, there are five storage nodes each having an IP (Internet Protocol) address 192.168.1.1, 192.168.1.2, etc. The number of storage nodes is, needless to say, just an example. The query contains a data identifier "2B9B4A97-76E5-499E-A21A6D7932DD7927", which may for instance be a Universally Unique Identifier (UUID).

The storage nodes may scan themselves for data corresponding to the identifier. If such data is found, a storage node may send a response, which is received 33 by the server 7, cf. FIG. 2B. As illustrated, the response may optionally contain further information in addition to an indication that the storage node has a copy of the relevant data. Specifically, the response may contain information from the storage node directory about other storage nodes containing the data, information regarding which version of the data is contained in the storage node, and/or information regarding which load the storage node at present is exposed to.

Figure 2C:
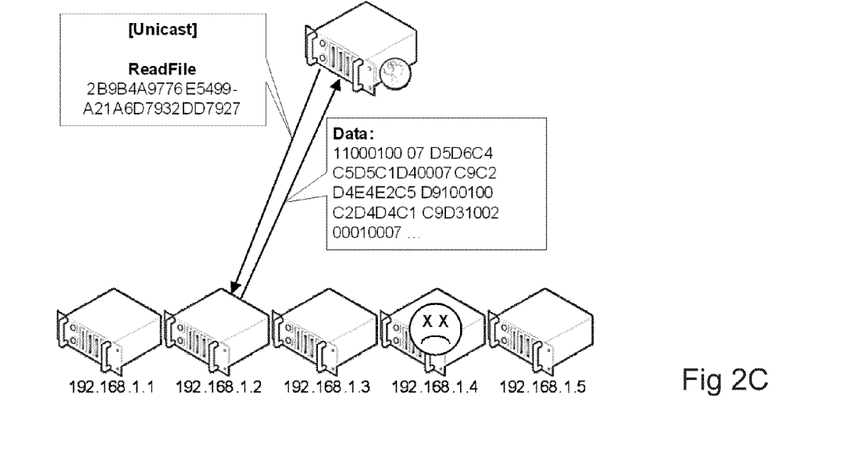

Based on the responses, the server may select 35 one or more storage nodes from which data is to be retrieved, and may send 37 a unicast request for data to that/those storage nodes, cf. FIG. 2C.

In response to the request for data, the storage node/nodes may send the relevant data by unicast to the server which receives 39 the data. For purposes of illustration, a single storage node may be selected. While this is sufficient, it is possible to select more than one storage node in order to receive two sets of data, for example to perform a consistency check. If the transfer of data fails, the server may select another storage node for retrieval.

The selection of storage nodes may be based on an algorithm that takes several factors into account in order to achieve a good overall system performance. For example, the storage node having the latest data version and the lowest load may be selected although other concepts are fully conceivable.

Optionally, the operation may be concluded by server sending a list to all storage nodes involved, indicating which nodes contains the data and with which version. Based on this information, the storage nodes may themselves maintain the data properly by the replication process to be described.

FIGS. 4A-4C, and FIGS. 5a-c illustrate an example data writing process for the distributed data storage system.

Figure 4A:
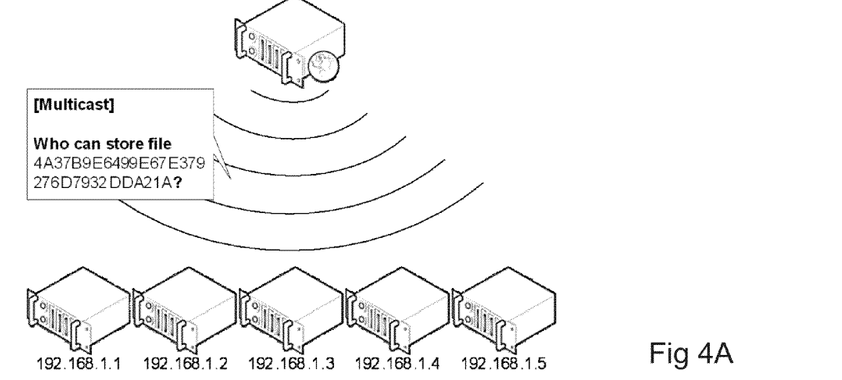
FIGS. 4A-4C, and FIG. 5a illustrate a data writing process.
Figure 5A:
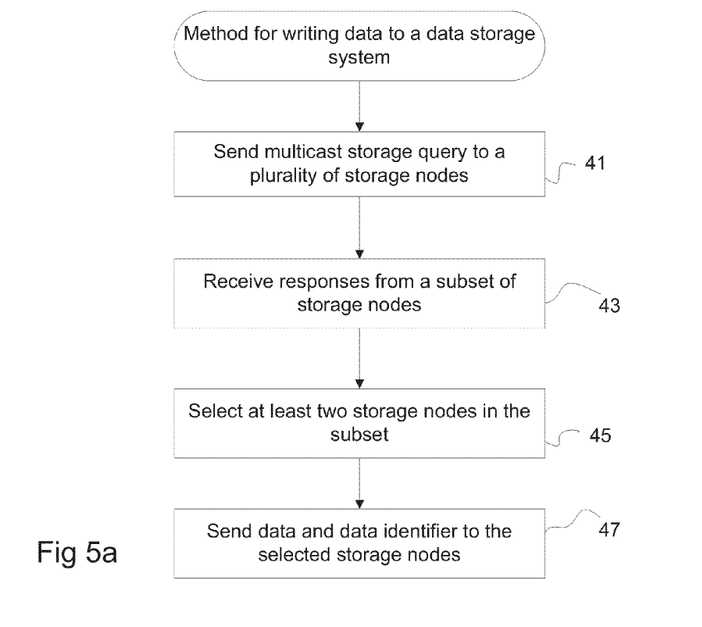

With reference to FIG. 4A and FIG. 5a the method may include a server sending 41 a multicast storage query to a plurality of storage nodes. The storage query may include a data identifier and a query as to whether the receiving storage nodes can store a file. Optionally, if the file identity is included in the query, the storage nodes may check with their internal directories whether they already have a file with this name, and may notify the server 7 in the unlikely event that this is the case, such that the server may rename the file.

Figure 4B:
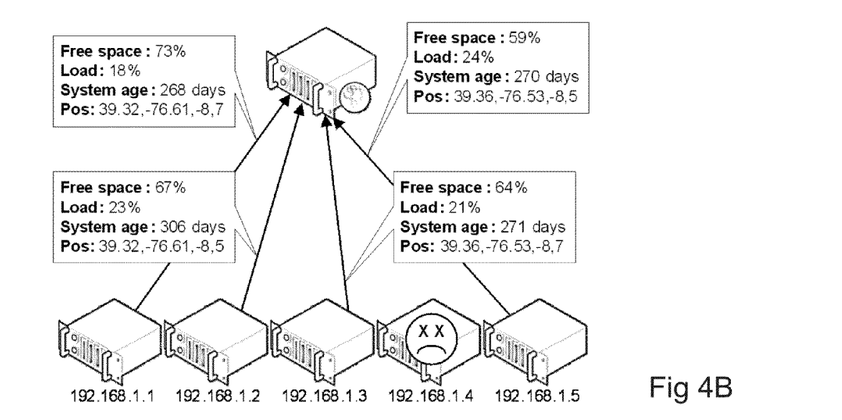
Figure 4C:
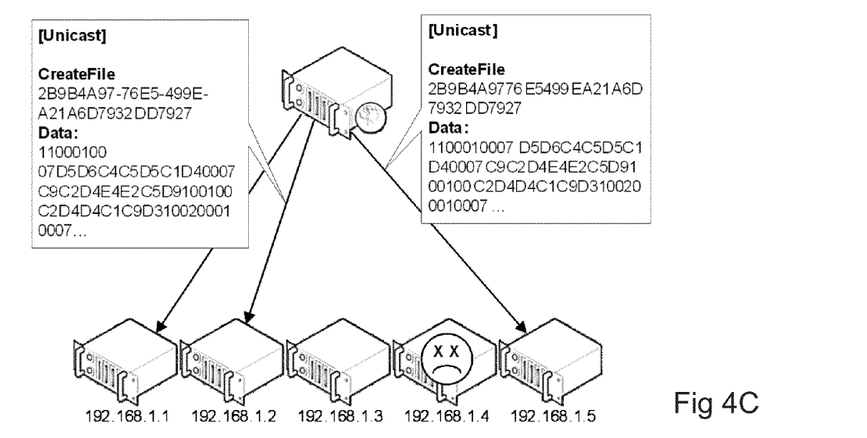

In any case, at least a subset of the storage nodes may provide responses by unicast transmission to the server 7. For example, storage nodes having a predetermined minimum free disk space may answer the query. The server 7 may receive 43 the responses which may include geographic data relating to the geographic position of each server. For instance, as indicated in FIG. 4B, the geographic data may include the latitude, the longitude and the altitude of each server. Other types of geographic data may however also be conceivable, such as a ZIP code or the like.

In addition to the geographic data, further information may be provided that serves as an input to a storage node selection process. In the illustrated example, the amount of free space in each storage node is provided and/or an indication of the storage node's system age and/or an indication of the load that the storage node currently experiences. The responses may be stored or cached for future use.

Based on the received responses, the server may select 45 at least two, in another example embodiment three, storage nodes in the subset for storing the data. The selection of storage nodes may carried out by means of an algorithm that take different data into account. The selection may be carried out in order to achieve some kind of geographical diversity. In an example, file servers are selected such that file servers in the same rack are not selected as storage nodes. Typically, a great geographical diversity may be achieved, even selecting storage nodes on different continents. In addition to the geographical diversity, other parameters may be included in the selection algorithm. For example, geographical diversity may be a primary criteria. In this example, as long as a minimum geographic diversity is achieved, e.g. free space, system age and current load may also be taken into account. Other criteria may serve as the primary criteria. It is advantageous to have a randomized feature in the selection process as will be discussed below.

The selection may include calculating, based on each node's storage node information (system age, system load, etc.) a probability factor which may correspond to a storage node aptitude score. A younger system for instance, which is less likely to malfunction, may have a higher calculated score. The probability factor may thus be calculated as a scalar product of two vectors. For example, one vector may contain the storage node information parameters (or as applicable their inverses), and the other vector may contain corresponding weighting parameters.

The selection may then comprise semi-randomly selecting storage nodes, where the probability of a specific storage node being selected may depend on its probability factor. Typically, if a first server has a twice as high probability factor as a second server, the first server may have a twice as high probability of being selected.

The selection process for a file to be stored may be carried out based on responses received as the result of a multicast query carried out for that file. However, it would also be possible to instead use responses recently received as the result of a multicast query issued in relation to the storing of another file. As a further alternative, the server can regularly issue general multicast queries "what is your status" to the storage nodes, and the selection may be based on the responses then received. Thus, it may not be necessary to carry out a multicast query for every single file to be stored.

When the storage nodes have been selected, the data to be stored and a corresponding data identifier may be sent to each selected node, for example using a unicast transmission.

Optionally, the operation may be concluded by each storage node, for example after successful completion of the writing operation, sending an acknowledgement to the server. The server then may send a list to all storage nodes involved indicating which nodes have successfully written the data and which have not. Based on this information, the storage nodes may themselves maintain the data properly by the replication process to be described. For instance if one storage node's writing failed, there one or more files may be replicated to one more storage node in order to achieve the desired number of storing storage nodes for that file.

It may be that the servers are more or less equal in terms of basic characteristics, such as response time and reliability. Further, it may be that all data stored is considered equal from the storage system's point of view (e.g., no data is of greater importance or of a higher priority than other data in the system). In another example, a differentiation in terms of services is provided, both vis-à-vis different types of data and different types of users. In other words, some data may be treated differently than others and/or some users/storage nodes may be treated differently than others.

For example, storage nodes may differ in terms of load, free disk space, system age, etc., which relate to how the storage nodes are and have been used. Further, the differences may relate to the type of storage node and its inherent capabilities.

For instance, as initially mentioned, a storage node may include different types of storage media, such a hard drives, solid state drives (SSDs), and random access memory (RAM), devices and/or the like. Reading from a hard drive may involve mechanical movement of a reader head and may therefore be slower that reading from a comparatively more expensive SSD, which may not include moveable parts. A RAM storage may be even faster, but may be considered less reliable, since a power blackout may clear the data. Also, different types of hard drives may have different reading times. In general, a storage node or an individual disk in a storage node may provide a certain response time rate, which may be expressed in different ways, e.g. average response time=30 ms, or type=SSD, which may be used in the selection/writing process as will be discussed.

Further, the quality and configuration of the storage media, and the premises in which it is installed, may affect the reliability of the storage, even though a replication process providing redundancy may be provided, as will be discussed later. For instance, each disk may have a probability of failure, which may be expressed as an annualized failure rate (AFR). Local disk configurations may also imply different level. For instance a RAID 1 configuration may increase the reliability greatly. Additionally, the environment in which the storage medium is installed may influences reliability. For instance, room cooling and humidity, uninterrupted power supplies, UPS, and 24 hours available surveillance maintenance staff are factors that may affect the overall reliability. Thus, a node or an individual disk in a node may provide a certain level of reliability that may be used in the selection/writing process.

Other factors that may be considered in the writing process may be energy consumption of the disk or storage node, territory/legislation of the storage node, etc.

In summary there may be defined a number of node properties including but not limited to: type of disk (e.g. hard drive or SSD), response time, redundancy configuration (e.g. RAID 1), reliability (e.g. AFR), environment (e.g. cooled premises with UPS), energy consumption, and/or the like.

These different properties of different storage nodes or disks may meet different requirements for different files or users.

For example, a word processor file may be stored on a comparatively slow disk, as a delay of half a second when opening a word processor file does not significantly obstruct the user. Real time data on the other hand may require fast access. The same applies for data that may be accessed in a chain of steps, and where each link in this chain adds to the overall delay.

The level of reliability may also be a factor that is considered. Some data may be so critical that it should be stored on the best possible nodes or node disks, in terms of reliability. Other data may be easily restored if lost and yet other data may be simply unimportant, and such data may on the other hand be stored on any storage node.

Another option, to be used alone or in combination with high reliable storage nodes, for very important data is to increase the number of used storage nodes, e.g. three or four copies may be stored.

Another issue with data storage is energy consumption. Some environmental requirements imposed on a service may require that its data is stored only on disks with very low energy consumption, while response times are less important, even allowing a hard drive to go into a standby mode when not used.

Another example requirement may relate to legislation or policies. For instance, it may be the case that classified data may be required to be stored in a specific territory.

Another possibility is to obtain price differentiation, e.g. that users that purchase premium subscriptions may have their data stored on particularly fast and/or reliable disks.

As such, there are a number of different factors that may be met by matching files or users with specific sets of storage nodes in the storage cluster. This may be carried out by adding features to the writing method outlined above.

Figure 5B:
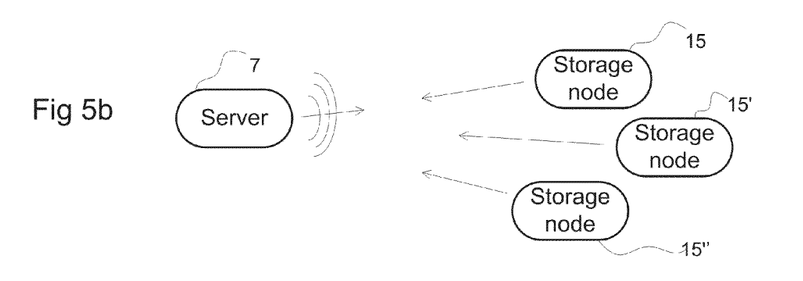
FIGS. 5b and 5c illustrate modifications of this process to obtain content sensitive writing.
Figure 5C:
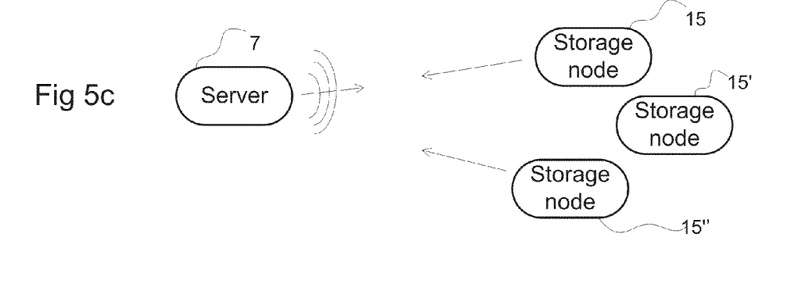

A method for implementing such matching may be outlined in two versions with reference to FIGS. 5b and 5c.

In FIG. 5b, a storage query may be sent out by the server 7 as previously described (cf. 41, FIG. 5a). The responses may be issued by the storage nodes, 15, 15', 15" which may include information about storage node characteristics. For example, the information about the storage node characteristics may include at least one of a response time parameter, a reliability parameter, a territorial parameter and/or an energy consumption parameter. When carrying out the previously described selection (cf. 45, FIG. 5a) the server may take those parameters into account, such that suitable servers are selected in view of file type, user priority, or other requirements.

In an example method, illustrated in FIG. 5c, the storage query, which may be sent out by the server 7, may include a storage node characteristics requirement, which may be based on one or more of the previously mentioned parameters. Then responses may be issued by the storage nodes, 15, 15" which fulfil the storage node characteristics requirement. When carrying out the previously described selection (cf. 45, FIG. 5a) the server may assume storage nodes that responded fulfil the node parameters, since the query provided that storage nodes respond on condition that they fulfil the requirements in question.

While this procedure may avoid irrelevant traffic, e.g. unicast transmission by storage nodes which do not fulfil the requirements, the former method as illustrated in FIG. 5b may allow greater flexibility, for example storage on sub-standard storage nodes in the event that there is an insufficient number of available storage nodes that fulfil the characteristics requirement.

The data writing method in itself may allow an API in a server 7 to store data in a very robust way, e.g. as excellent geographic diversity may be provided.

In addition to the writing and reading operations, the API in the server 7 may carry out operations that delete files and update files. These processes may be described in connection with the data maintenance process below.

The data maintenance process is may ensure that a reasonable number of non-malfunctioning storage nodes each store the latest version of each file. Additionally, it may ensure that no deleted files are stored at any storage node. The maintenance may be carried out by the storage nodes themselves. For example, the system may lack a dedicated "master" that takes responsibility for the maintenance of the data storage. By allowing any individual storage node to act as a master for a particular piece of data for a limited amount of time, improved robustness and reliability may be achieved, as the "master" may otherwise be a weak spot in the system.

Figure 6:
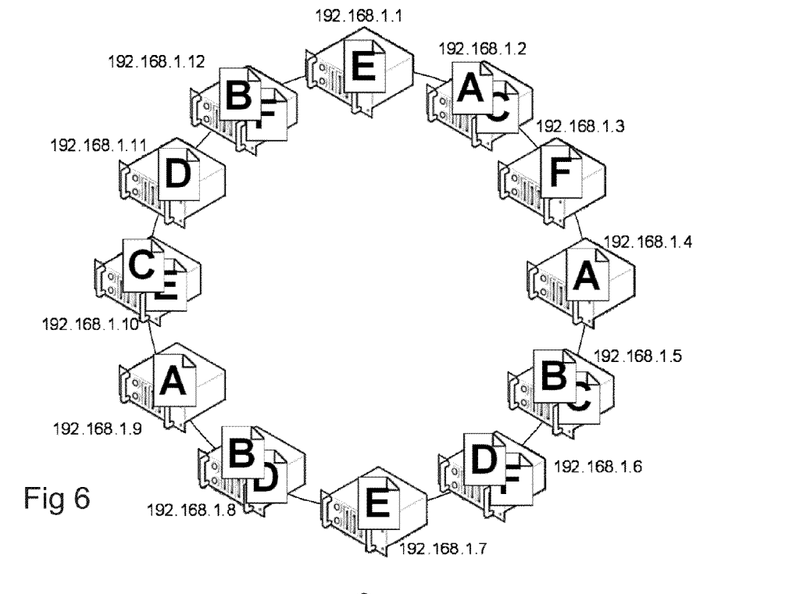
FIG. 6 illustrates schematically a situation where a number of files are stored among a number of data storage nodes.

FIG. 6 illustrates schematically an example where a number of files are stored among a number of data storage nodes. For purposes of illustration, twelve nodes, having IP addresses consecutively numbered from 192.168.1.1 to 192.168.1.12, are depicted. Needless to say however, the IP address numbers need not be in the same range at all and there may be more or less than twelve nodes. The nodes are placed in a circular order to simplify the description, i.e. the nodes need not have any particular order. Each node may store one or two files identified, for the purpose of simplicity, by the letters A-F. However, each node may store many more files, and the files A-F are depicted for purposes of illustration.

Figure 8:
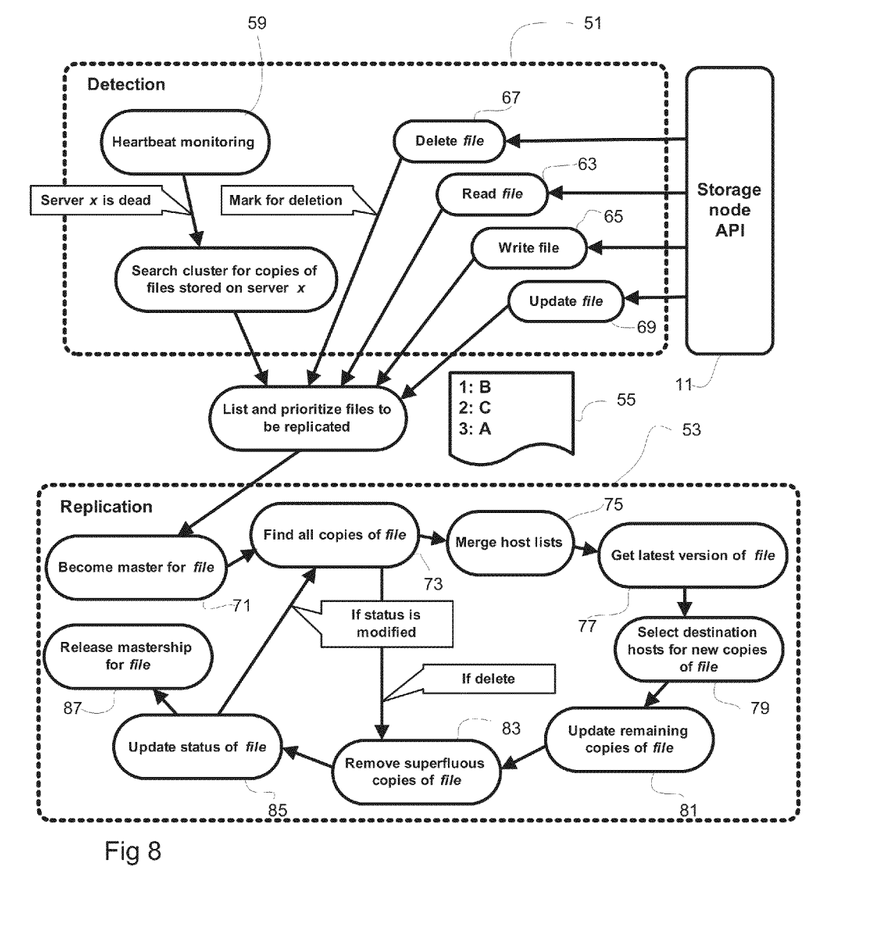
FIG. 8 is an overview of a data maintenance process.

With reference to FIG. 8, the method for maintaining data may include detecting 51 conditions in the data storage system that imply the need for replication of data between the nodes in the data storage system. A replication process 53 may be initiated upon detection 51 of the conditions. The result of the detection process 51 may be a list 55 of files for which the need for replication has been identified. The list may further include data regarding the priority of the different needs for replication. Based on this list the replication process 53 is carried out.

The robustness of the distributed storage may depend on the number of storage nodes that maintain copies or instances of a specified file. To ensure reliability and robustness, a reasonable number of copies of each correct versions of a file be stored in the system. In the illustrated case, three copies of each file may be stored. However, should for instance the storage node with the address 192.168.1.5 fail, the desired number of stored copies for files "B" and "C" may be two, rather than the desired three.

One event that results in a need for replication may therefore be the malfunctioning of a storage node in the system.

Figure 7:
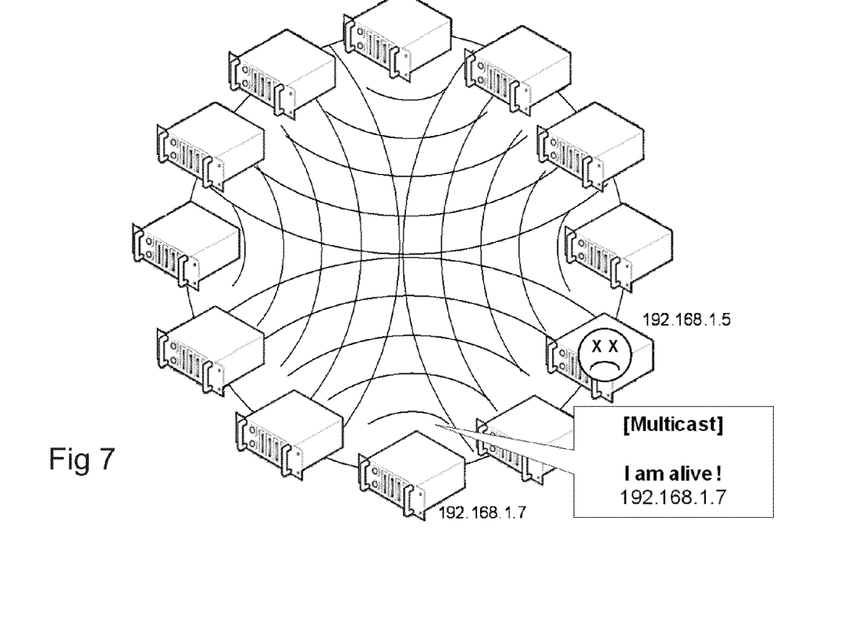
FIG. 7 illustrates the transmission of heartbeat signals.

Each storage node in the system may monitor the status of other storage nodes in the system. This may be achieved by letting each storage node emit a so-called heartbeat signal at regular intervals, as illustrated in FIG. 7. In the illustrated case, the storage node with address 192.168.1.7 may emit a multicast signal 57 to the other storage nodes in the system, which may indicate that it is working correctly. This signal may be received by all other functioning storage nodes in the system or a subset of nodes carrying out heartbeat monitoring 59 (cf. FIG. 8). For purposes of illustration, the storage node with address 192.168.1.5 may be malfunctioning and may not emit any heartbeat signal. Therefore, the other storage nodes may notice that no heartbeat signal has been emitted by this node for a period of time, which may indicate that the storage node in question is down.

The heartbeat signal may include the storage node's address, and may also include its node list version number. Another storage node, which may listen to the heartbeat signal, may discover based on the heartbeat signal that the transmitting storage node has a later version node list than it is currently storing. The listening storage node may then request that the transmitting storage node transfer its node list. In an example, the addition and removal of storage nodes into the system may be achieved by adding or removing a storage node and sending a new node list version to one single storage node. This node list may then be recursively spread to all other storage nodes in the system.

Again with reference to FIG. 8, each storage node may search 61 its internal directory for files that are stored by the malfunctioning storage node. Storage nodes which store files "B" and/or "C" may determine that a storage node that stores file "B" and/or "C" is malfunctioning storage node and may therefore add the corresponding file on their lists 55.

The detection process may however also reveal other conditions that imply the need for replicating a file. Typically such conditions may be inconsistencies, e.g. that one or more storage nodes may have an obsolete version of the file. A delete operation may also imply a replication process as this process may carry out the actual physical deletion of the file. The server's delete operation indicate that the storage nodes set a deletion flag for the file in question. Each node may therefore monitor reading and writing operations carried out in the data storage system. Information provided by the server 7 at the conclusion of reading and writing operations, respectively, may indicate that one storage node contains an obsolete version of a file (e.g. in the case of a reading operation) or that a storage node did not successfully carry out a writing operation. In both cases the action may indicate that the replication process should occur such that the overall objects of the maintenance process are fulfilled.

In addition to the reading and writing operations 63, 65, additional processes may provide indications that a replication process may be initiated. For example, the deleting 67 and updating 69 processes may trigger the replication process.

The deleting process is initiated by the server 7 (cf. FIG. 1). Similar to the reading process, the server may send a query by multicasting to all storage nodes (or a subset thereof), in order to find out which storage nodes have data with a specific data identifier. The storage nodes may scan their systems for data with the relevant identifier and may respond by a unicast transmission if they have the data in question. The response may include a list, from the storage node directory, of other storage nodes containing the data. The server 7 may then send a unicast request, for example to the storage nodes that store the file, that the file be deleted. Each storage node may set a flag relating to the file and indicating that it should be deleted. The file may then be added to the replication list, and an acknowledgement is sent to the server. The replication process then physically deletes the file as will be described.

The updating process may include a search function, similar to the one of the deleting process, and a writing function, which may be similar to the one carried out in the writing process. The server may send a query, for example by multicasting to all storage nodes or a subset thereof, in order to find out which storage nodes include data with a specific data identifier. The storage nodes may scan themselves for data with the relevant identifier, and may respond by a unicast transmission if they have the data in question. The response may include a list, from the storage node directory, of other storage nodes containing the data. The server 7 then may send a unicast request, requesting that the storage nodes update the data. The request may contain the updated data. The storage nodes updating the data may send an acknowledgement to the server, which may respond by sending a unicast transmission containing a list with the storage nodes that successfully updated the data. The response may also include storage nodes which did not successfully update the data. Again, this list may be used by the maintenance process.

Again with reference to FIG. 8 the read 63, write 65, delete 67, and/or update 69 operations may indicate that a need for replication exists. The heartbeat monitoring 59 may also indicated that replication should be performed. The overall detection process 51 may generate data regarding which files need be replicated. For instance, a reading or updating operation may reveal that a specific storage node contains an obsolete version of a file. A deletion process may set a deletion flag for a specific file. The heartbeat monitoring may reveal that a number of files, stored on a malfunctioning storage node, should be replicated to a new storage node.

Each storage node may monitor the need for replication for all the files it stores and may maintain a replication list 55. The replication list 55 may thus contain a number of files that should be replicated. The files may be ordered in correspondence with the priority for each replication. For example, there may be three different priority levels. In an example, the highest level may be reserved for files which the storage node holds the last online copy. Such a file may be quickly replicated to other storage nodes such that a reasonable level of redundancy may be achieved. A medium level of priority may relate to files where the versions are inconsistent among the storage nodes. A lower level of priority may relate to files which are stored on a storage node that is malfunctioning.

The storage node may replicate the files on the replication list 55 in accordance with their level of priority. The replication process may be described for a storage node which is here called the operating storage node, although all storage nodes may operate in this way.

The replication part 53 of the maintaining process may start with the operating storage node attempting 71 to become the master for the file it intends to replicate. The operating storage nodes may send a unicast request to become master to other storage nodes that are known store the file in question. The directory 19 (cf. FIG. 1) may provide a host list which may include information regarding which storage nodes to ask. In the event, for example in case of a colliding request, that one of the storage nodes does not respond affirmatively, the file may be moved back to the list for the time being, and an attempt may be made with the next file on the list. Otherwise the operating storage node may be considered to be the master of this file and the other storage nodes may set a flag indicating that the operating storage node is master for the file in question.

The operating storage node may find 73 all copies (or a subset thereof) of the file in question in the distributed storage system. For example, the operating storage node may send a multicast query to all storage nodes (or a subset thereof), requesting the identification of storage node that maintain copies of the file. The storage nodes that maintain copies the file may submit responses to the query, and the responses may contain the version of the file they keep as well as their host lists, e.g. the list of storage nodes containing the relevant file that is kept in the directory of each storage node. These host lists sent to the operating node may be merged 75 by the operating storage node, such that a master host list may be formed corresponding to the union of all retrieved host lists. If additional storage nodes are found, which were not asked when the operating storage node attempted to become master, the request may also be sent to the additional storage nodes. The master host list may contain information regarding which versions of the file the different storage nodes keep and may illustrate the status of the file within the entire storage system.

Should the operating storage node not have the latest version of the file in question, this file may then be retrieved 77 from one of the storage nodes that do have the latest version.

The operating storage node may decide 79 whether the host list should be changed, for example if additional storage nodes should be added. If so, the operating storage node may carry out a process very similar to the writing process as carried out by the server and as described in connection with FIGS. 4A-4C, and 5. The result of this process may be that the file is written to a new storage node.

In case of version inconsistencies, the operating storage node may update 81 copies of the file that are stored on other storage nodes, such that all files stored have the correct version.

Superfluous copies of the stored file may be deleted 83. If the replication process is initiated by a delete operation, the process may begin at this step. For example, once the storage nodes that maintain copies of the file to be deleted have accepted the deletion of the file, the operating storage node may request, for example via using unicast, all storage nodes to physically delete the file in question. The storage nodes may acknowledge that the file is deleted.

Further the status, e.g. the master host list of the file may be updated. It is then optionally possible to repeat 73-83 to ensure that a need for replication is no longer present. This repetition may result in a consistent master host list that need not be updated in step 85.

The replication process for that file may be concluded, and the operating storage node may release 87 the status as master of the file, for example by sending a corresponding message to all other storage nodes on the host list.

This system where each storage node may take responsibility for maintaining all the files it stores throughout the set of storage nodes may provide a self-repairing (e.g., in case of a storage node malfunction) self-cleaning (e.g., in case of file inconsistencies or files to be deleted) system with excellent reliability. The system may be scalable and may store files for a great number of different applications simultaneously.

The invention is not restricted to the specific disclosed examples and may be varied and altered in different ways within the scope of the appended claims.

What is claimed:

1. A method implemented by a server for writing data in a data storage system that includes a plurality of storage nodes, the method comprising:
    the server determining one or more data properties of data to be stored in the data storage system;
    the server selecting one or more storage node characteristics based on the one or more properties of the data to be stored, wherein storage nodes selected to store the data will each possess the one or more storage node characteristics;
    the server sending a multicast storage query to the plurality of storage nodes based on determining to store the data in the data in the data storage system, the multicast storage query comprising an indication of the one or more storage node characteristics selected based on the one or more properties of the data to be stored, wherein the one or more storage node characteristics comprise one or more of a requirement regarding at least one of a type of disk, a response time, a redundancy configuration, a reliability level, a storage node environment, or storage node energy consumption;
    the server receiving a plurality of responses from a subset of the plurality of storage nodes, wherein the subset of the plurality of storage nodes each possess the one or more storage node characteristics indicated in the multicast storage query and each of said responses comprises a storage node property; and
    the server selecting at least two storage nodes in the subset for storing said data based on said responses, wherein the selecting is based on the one or more data properties of the data to be stored and respective storage node properties of the at least two storage nodes in the subset.

2. The method according to claim 1, wherein the respective storage node properties comprise at least one of: a type of disk, a response time, a redundancy configuration, a reliability, a node environment, a territory, or an energy consumption.

3. The method according to claim 1, wherein the one or more data properties comprise a requirement that the data is quickly accessible and the one or more storage node characteristics comprise a storage node response time.

4. The method according to claim 1, wherein the one or more data properties comprise a type of user that created or edited the data.

5. The method according to claim 1, wherein the one or more data properties comprise a file type.

6. A method implemented by a server for writing data in a data storage system, the data storage system including a plurality of storage nodes, the method comprising:

the server determining one or more data properties of data to be stored in the data storage system;

the server selecting a set of storage node requirements based on the one or more data properties of the data to be stored, wherein storage nodes selected to store the data will each meet the set of storage node requirements;

the server sending a multicast storage query to the plurality of storage nodes based on determining to store data in the data storage system, the multicast storage query including an indication of the set of storage node requirements selected based on the one or more properties of the data to be stored;

the server receiving a plurality of responses from a subset of the plurality of storage nodes, wherein the subset storage nodes comply with of the set of storage node requirements and the plurality of responses comprise storage node characteristics associated with the subset of storage nodes; and the server selecting at least two storage nodes in the subset for storing said data based on the responses.

7. The method according to claim 6, wherein said set of node requirements include at least two of: a type of disk, a response time, a redundancy configuration, a reliability level, a node environment, a territory, or an energy consumption.

8. The method according to claim 6, wherein the one or more data properties comprise a type of user that created or edited the data.

9. The method according to claim 6, wherein the one or more data properties comprise a file type.

10. The method according to claim 6, wherein the set of storage node requirements comprises minimum reliability requirement.

11. A server comprising:
A processor configured to:
  determine one or more data properties of data to be stored in a data storage system comprising a plurality of storage nodes;
  select one or more storage node characteristics based on the one or more properties of the data to be stored, wherein storage nodes selected to store the data will each possess the one or more storage node characteristics;
  send a multicast storage query to a plurality of storage nodes based on determining to store data in the data in the data storage system, the multicast storage query comprising an indication of the one or more storage node characteristics selected based on the one or more properties of the data to be stored, wherein the one or more storage node characteristics comprise one or more of a requirement regarding at least one of a type of disk, a response time, a redundancy configuration, a reliability level, a storage node environment, or storage node energy consumption;
  receive a plurality of responses from a subset of the plurality of storage nodes, wherein the subset of the plurality of storage nodes each possess the one or more storage node characteristics indicated in the multicast storage query; and
  select at least two storage nodes in the subset for storing said data based on said responses, wherein the selecting is based on the one or more data properties of the data to be stored and respective storage node properties of the at least two storage nodes in the subset.

12. The server according to claim 11, wherein the respective storage node properties comprise at least one of: a type of disk, a response time, a redundancy configuration, a reliability, a node environment, a territory, or an energy consumption.

13. The server according to claim 11, wherein each of the plurality of responses comprise at least one storage node property of the responding storage node.

14. The server according to claim 11, wherein the one or more data properties comprise a type of user that created or edited the data.

15. The server according to claim 11, wherein the one or more data properties comprise a file type.

16. The method according to claim 10, wherein a first response of the plurality of responses comprises a first storage node characteristic of a first responding storage node and the first storage node characteristic comprises an indication of a reliability statistic for the first responding storage node.

* * * * *